(12) United States Patent
Qi

(10) Patent No.: US 7,630,984 B2
(45) Date of Patent: Dec. 8, 2009

(54) METHOD OF DETERMINING ACCESS CONTROL EFFECT BY USING POLICIES

(75) Inventor: Naizhen Qi, Zama (JP)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 11/286,948

(22) Filed: Nov. 25, 2005

(65) Prior Publication Data

US 2006/0117014 A1 Jun. 1, 2006

(30) Foreign Application Priority Data

Nov. 26, 2004 (JP) ............................. 2004-343090

(51) Int. Cl.
*G06F 7/00* (2006.01)
*G06F 17/30* (2006.01)
(52) U.S. Cl. ..................... 707/9; 707/3; 707/4; 707/5; 707/10
(58) Field of Classification Search ................ 707/9
See application file for complete search history.

(56) References Cited

U.S. PATENT DOCUMENTS

| 7,127,461 B1 * | 10/2006 | Zhu et al. ...................... 707/9 |
| 2003/0014397 A1 * | 1/2003 | Chau et al. .................... 707/3 |
| 2004/0148278 A1 * | 7/2004 | Milo et al. ..................... 707/3 |
| 2004/0193607 A1 * | 9/2004 | Kudo et al. .................... 707/9 |
| 2004/0205089 A1 * | 10/2004 | Alon et al. ................. 707/200 |
| 2004/0213086 A1 * | 10/2004 | Terzian ........................ 368/82 |
| 2005/0038783 A1 * | 2/2005 | Lei et al. ....................... 707/5 |
| 2005/0050010 A1 * | 3/2005 | Linden .......................... 707/3 |
| 2005/0055355 A1 * | 3/2005 | Murthy et al. .............. 707/100 |
| 2005/0076030 A1 * | 4/2005 | Hada et al. ..................... 707/9 |
| 2005/0229158 A1 * | 10/2005 | Thusoo et al. .............. 717/115 |
| 2005/0262233 A1 * | 11/2005 | Alon et al. .................. 709/223 |
| 2005/0289150 A1 * | 12/2005 | Kudo .......................... 707/10 |
| 2006/0080316 A1 * | 4/2006 | Gilmore et al. ................ 707/9 |
| 2006/0106758 A1 * | 5/2006 | Chen et al. ..................... 707/2 |
| 2006/0143557 A1 * | 6/2006 | Chan et al. .................. 715/500 |

OTHER PUBLICATIONS

Bo Luo, Dongwon Lee, Wang-Chien Lee, and Peng Liu, "QFilter: Fine-Grained Run-Time XML Access Control Via NFA-Based Query Rewriting", Proceedings of the Thirteenth ACM International Conference on Information and Knowledge Management (CIKM'04), USA, ACM, Nov. 13, 2004, pp. 543-552.
Makoto Murata, Akihito Tozawa, and Michiharu Kudo, "XML Access Control Using Static Analysis", Proceedings of the 10th ACM Conference on Computer and Communications Security (CCS'03), USA, ACM, Oct. 31, 2003, pp. 73-84 Publication Date: Oct. 31, 2003.

* cited by examiner

*Primary Examiner*—Hosain T Alam
*Assistant Examiner*—Usmaan Saeed
(74) *Attorney, Agent, or Firm*—Leonard T. Guzman

(57) ABSTRACT

When determining whether or not access by a user should be permitted by using policies, an access control determination device of the present invention expresses the access by the user to the data source with a predetermined path, retrieves an appropriate policy out of stored policies on the basis of the predetermined path, calculates an access permission value on the basis of the predetermined path, calculates an access effect value on the basis of the predetermined path and the policy which the policy retrieving unit has retrieved, and determines whether or not the access by the user to the data source should be permitted on the basis of the access permission value and the access effect value.

20 Claims, 5 Drawing Sheets

```
<patients>
<patient id='100'>
  <name><surname>Atkins</surname><firstname>Paul</firstname></name>
  <sex>Male</sex><born>1964</born>
  <address>
   <street>HarbourClose</street><housenumber>23</housenumber>
   <city>Portsmouth</city><postcode>PO2056HAR</postcode>
  </address>
  <occupation>Professional Driver</occupation>
  <insurance><company>NHS</company></insurance>
  <submitted>
   <date>19990315</date><symptoms>Headache, dizziness</symptoms><diagnosis>DC1</diagnosis>
   <docto rpager="342">
    <name>
     <surname>Godeep</surname><firstname>John</firstname><middlename>J.</middlename>
     <title>Dr.</title>
    </name>
   </doctor>
  </submitted>
  <therapy>
   <other><description>Decompression chamber</description><amount>18hrs</amount></other>
  </therapy>
 </patient>
</patients>
```

FIG. 5

```
Flag1=false
Flag2=false
// CHECK CONTROL EFFECT OF EACH NODE IN ORDER FROM ROOT NODE
For (i=0; i<n; i++)
    If(i=0) then $P_i=e_1$ else $P_i=e_1/e_2/\cdots/e_{i+1}$ end if
    For (j=0); j<|Q|, j++)
        If ($Q_j$ IS -R TO $P_i$) then
            Inaccessible
            Return
        Else if ($Q_j$ IS +r TO $P_i$) then
            Flag1=true
            Break
        Else if ($Q_j$ IS +R TO $P_i$ || $Q_j$ IS +R TO ANCESTOR OF $P_i$) then
            Flag2=true
            Break
        End if
    End for
End for
If (Flag=true || Flag2=true) then
    Accessible
    Return
Else
    Inaccessible
    Return
End if
```

FIG. 6

METHOD OF DETERMINING ACCESS CONTROL EFFECT BY USING POLICIES

BACKGROUND OF THE INVENTION

1. Field of the Invention

The present invention relates to a method of determining an access control effect by using policies. More particularly, the present invention relates to means for determining an effect when a user attempts to access the data stored in a database server, and a method thereof.

2. Background Art

In order to acquire data to be processed, it has heretofore been conducted to access a database server storing the data. In this access, the user uses a computer terminal, which is a client, acquiring the data by accessing the database server via a Local Area Network (LAN) and/or the Internet. The data stored is described in eXtensible Markup Language (XML) or Hyper Text Markup Language (HTML). Particularly, a document described in XML is referred to as an XML document. The XML document is known as a hierarchically structured document which can be hierarchically structured according to the intention of an information provider. Such XML documents are widely used from a large scale database such as a genome information database to a small scale database such as medical records.

Here, there is a case where an administrator of the database performs settings on the XML documents in which, when a user accesses the database, the access is denied depending on the user. For example, an administrator of a medical records database in a hospital has to perform control so that a patient cannot access the medical records data of his/her own.

Specifically, a method is known in which access control is performed by the use of a rule referred to as a policy. For example, the policy is determined on the basis of names, job titles, sections and the like of users.

Then, by the use of the policy, access control is performed for each file or each folder as the Windows (registered trademark) file system adopts. Thus, it can be prevented that a user or a group of users with no permission access the relevant file or folder.

However, there is a case where the control is demanded in which, for a user, the access to a part of a file is permitted, and the access to the remaining part of the file is denied.

For example, assume that medical records are created as one XML document and stored in a database. In this case, it is preferred that doctors can access the whole medical records information, but interns can access only the diagnostic information of patients. However, with the access control method described above, the policy can be set only on a file-by-file basis. Accordingly, it is impossible to perform access control with respect to a part of the XML document.

As a method for solving such a problem, a control device enabling access for each internal structural unit of an XML document is known (Japanese Patent Laid-Open No. 2001-273285, hereinafter referred to as Patent Document 1). In Patent Document 1, an access control device which controls access for each internal structural unit of a document by incorporating policies into an XML document is disclosed. The XML document of Patent Document 1 includes records which are data of a database, and policies each of which is set for each of the records. When a user accesses a part of the XML document, the access control device reads the incorporated policies and controls the access.

However, this access control device is not suitable when the number of records in the database is large. This is because when the number of records in a database increases, the number of policies for controlling the access to the records also increases, and thus the XML document becomes very large.

For example, with regard to genome information, in some cases, the data size of the record of an XML document becomes one gigabyte or more. In addition, a large number of users of enterprises, academic societies and the like access the XML document. Accordingly, it is necessary to set the policy for each of the large number of users who access the XML document, and the data amount of the policies becomes enormous. Therefore, both of the data amount of the record and the data amount of the policies become enormous, and the file of the XML document becomes very large.

Under the circumstances, a method of separating policies from an XML document and making the policies into a database is known (Naishin Seki, Michiharu Kudo, "Access Control Model Using Pathtables for XML Database", Computer Security Group, Information Processing Society, Nov. 14, 2003; hereinafter referred to as Naishin Seki). Naishin Seki discloses a method of constructing the policies as a table database (hereinafter referred to as "the tablemap type database"). The tablemap type database is composed of path expressions for designating specific parts of an XML document, and conditions respectively corresponding to the path expressions. When a user makes access, the access control device calculates a path expression corresponding to this access request. Then, the access control device reads out an effect corresponding to the path expression from a table, and determines whether or not the access to the part of the XML document designated by the path expression should be permitted.

When the tablemap type database as described above is used, there is a case where the number of policies (hereinafter, the policy in the case of the tablemap type database is referred to as "the entry") used to determine whether or not the access by the user to a part of the XML document should be permitted is not one, and a plurality of entries are retrieved. Consider the case where Daniel belonging to the accounting department attempts to make access to /accounting_department/payslip, for example. A system retrieves a policy, "Daniel can access /accounting_department and all the paths under /accounting_department," as the first policy. The system also retrieves a policy, "Daniel cannot access /accounting_department/payslip," as the second policy. When a plurality of policies have been retrieved in this way, the plurality of entries are checked individually, and whether or not the access by the user should be permitted is determined. Accordingly, a system in which a large number of policies are set can result in the case where the amount of the entries retrieved by the system becomes massive. In this case, the complexity of computation for determining the accessibility becomes high.

In the meantime, in addition to the tablemap method, there is a method called "the matching method," in which the access is determined by using policies employing a tree structure. With this method, it is possible to reduce the data amount of the policies as compared to the tablemap method by constituting the policies as tree-structured data.

Even in the case of using the matching method, when the number of retrieved policies is large, the computational complexity required to determine the accessibility becomes high. This will be explained by using FIG. 6. FIG. 6 shows an example as an algorithm used to determine the accessibility in the matching method. Here, in order to designate a part of an XML document, a path language is used. Specifically, $P_i$ is a path (which is an index concerning the object the access to which is controlled by policies, the index including information on the name of a user who is a subject under the control, and on a position in the XML document which is an object the access to which is controlled), and $e_i$ in $P_i=/e_1/e_2/e_3/\ldots/e_{l+1}$ corresponds to a node (which is the user name, or the position in the XML document, described above). The policy includes the path and an access control effect Q. The access control effect is information concerning the accessibility, such as access possible, access impossible, and the like.

FIG. 6 shows an algorithm used when the path is constituted of n nodes, and the number of access control effects (the number of policies) is Q. In this algorithm, the calculation loops the number of times corresponding to the number of the nodes, and in each iteration, the calculation loops the number of times corresponding to the number of the access control effects, so that the total computational complexity becomes n|Q|. In other words, when the access control is performed by using policies, the calculation is performed n|Q| times to determine the access control effect indicating the accessibility. In the case of a database having a large number of policies, or a database having a large number of nodes (which is a huge XML document, and is a database having many Objects described later), the computational complexity becomes enormous, and the efficiency of the database is reduced.

SUMMARY OF THE INVENTION

In consideration of the above described problems, an object of the present invention is to provide a determination method with which the computational complexity is kept as low as possible when the access to a data source (an XML document or the like) is controlled by using policies.

An access control determination device which, when a user attempts to make access to a data source, determines whether or not the access should be permitted depending on the user, the device including:

an access receiving unit expressing the access by the user to the data source with a predetermined path;

a policy storing unit storing policies each including a control path expressed with a path language, and a control effect representing whether or not the access should be permitted;

a policy retrieving unit retrieving an appropriate policy out of the policies on the basis of the predetermined path;

an access-permission-value calculating unit calculating an access permission value on the basis of the predetermined path;

an access-effect-value calculating unit calculating an access effect value on the basis of the predetermined path and the policy retrieved by the policy retrieving unit; and an access determination unit determining whether or not the access by the user to the data source should be permitted on the basis of the access permission value and the access effect value.

According to the present invention, when whether or not access by a user should be permitted is determined by using policies, an access receiving unit in the access control determination device expresses the access by the user to the data source with a predetermined path; a policy storing unit in the access control determination device stores policies each including a control path expressed with a path language, and a control effect representing whether or not the access should be permitted; a policy retrieving unit in the access control determination device retrieves an appropriate policy out of the stored policies on the basis of the predetermined path; an access-permission-value calculating unit in the access control determination device calculates an access permission value on the basis of the predetermined path; an access-effect-value calculating unit in the access control determination device calculates an access effect value on the basis of the predetermined path and the policy retrieved by the policy retrieving unit; and an access determination unit in the access control determination device determines whether or not the access by the user to the data source should be permitted on the basis of the access permission value and the access effect value.

Accordingly, with the present invention, it suffices to calculate an access permission value and an access effect value when it is determined whether or not the access should be permitted. Specifically, the computational complexity required to determine the access control effect is kept to a number which is (the number of times of calculation required to obtain the access effect value)+(the number of times of calculation required to obtain the access permission value), that is, to |Q+1| which is obtained by adding the number of calculation (one) required to obtain the access permission value to the number of access control effects (the number of policies). Thus, it is possible to determine whether or not the access should be permitted through a small amount of calculation less than the conventional computational complexity n|Q|.

BRIEF DESCRIPTION OF THE DRAWINGS

For a more complete understanding of the present invention and the advantages thereof, reference is now made to the following description taken in conjunction with the accompanying drawings.

FIG. 5 shows an example of a data source used in the present invention.

FIG. 6 is a diagram showing a conventional algorithm for making an access control determination when a plurality of policies exist.

DETAILED DESCRIPTION OF THE PREFERRED EMBODIMENT

A description will be given below of a preferred embodiment of the present invention with reference to the drawings.

Figure 1:
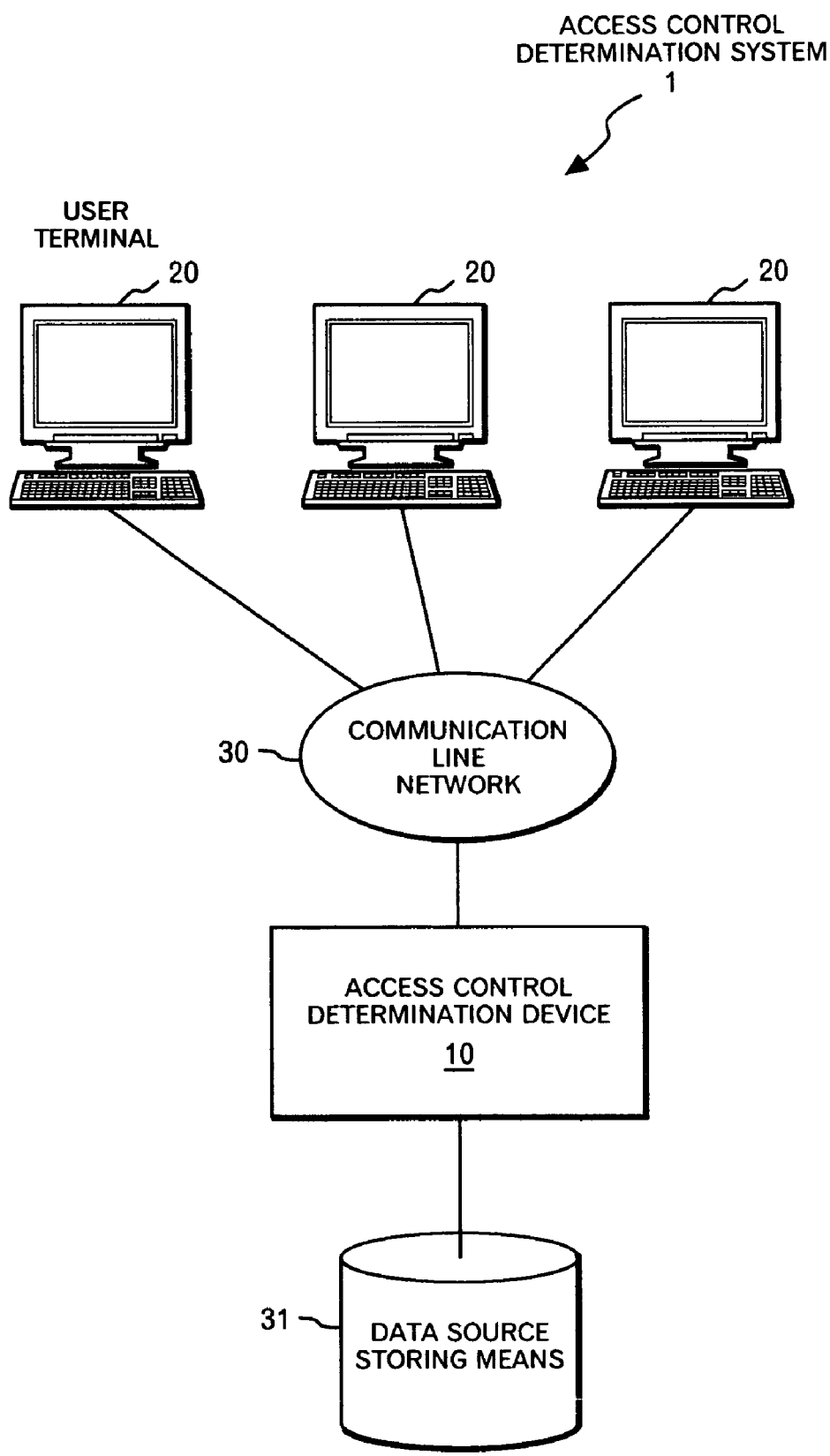
FIG. 1 is a diagram showing a hardware configuration of an access control determination system of the present invention.

As shown in FIG. 1, an access control determination system 1 includes a plurality of user terminals 20, an access control determination device 10 connected to the user terminals 20 via a communication line network 30, and data source storing means 31 similarly connected to the access control determination device 10 via the communication line network 30.

Figure 2:
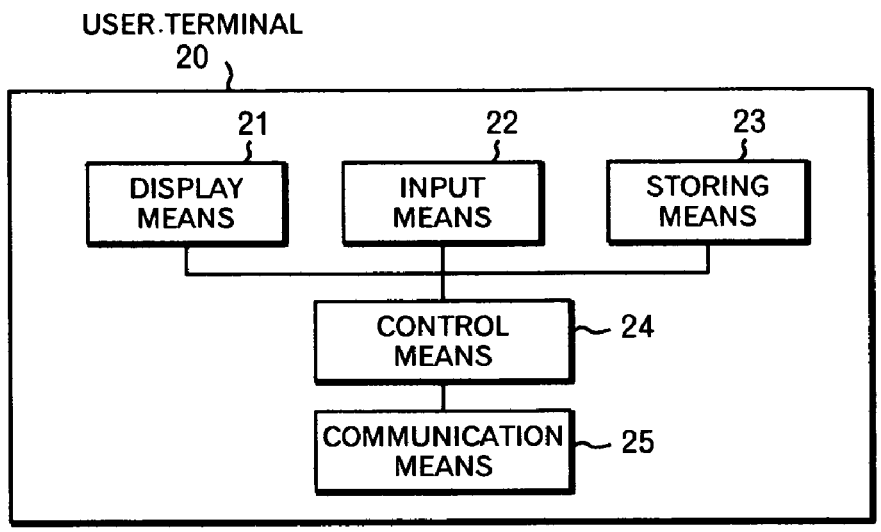
FIG. 2 is a diagram showing a hardware configuration of a user terminal.

As shown in FIG. 2, the user terminal 20 includes display means 21 such as a CRT display and a liquid crystal display, input means 22 such as a keyboard, a ten-key pad and a mouse, storing means 23 such as a hard disk and a memory, control means 24 such as a CPU, and communication means 25 such as a network card connected to the communication line network 30. The user terminal 20 has a client function which enables a user to access data, which is a data source, via the communication line network 30. When a user accesses a part of the data source, the user terminal 20 transmits an access request for performing actions such as reading out, writing and updating on the part of the data source. Here, the user terminal 20 may be either a computer terminal or a personal digital assistant.

The communication line network 30 is a network to connect the access control determination device 10 and the user terminals 20. The communication line network 30 may be either a Local Area Network (LAN) or the Internet.

The data source storing means 31 is a device in which the data source such as an XML document is stored. For example, the data source storing means 31 may be storing means such as a hard disk. Moreover, the data source storing means 31 may be installed either outside the access control determination device 10 as shown in FIG. 1, or inside the access control determination device 10. The data source may be an XML document or the like stored as a file. The part of the data source is a partial region of the data source such as an XML document. For example, the region is one which is enclosed by tags in the XML document.

Figure 3:
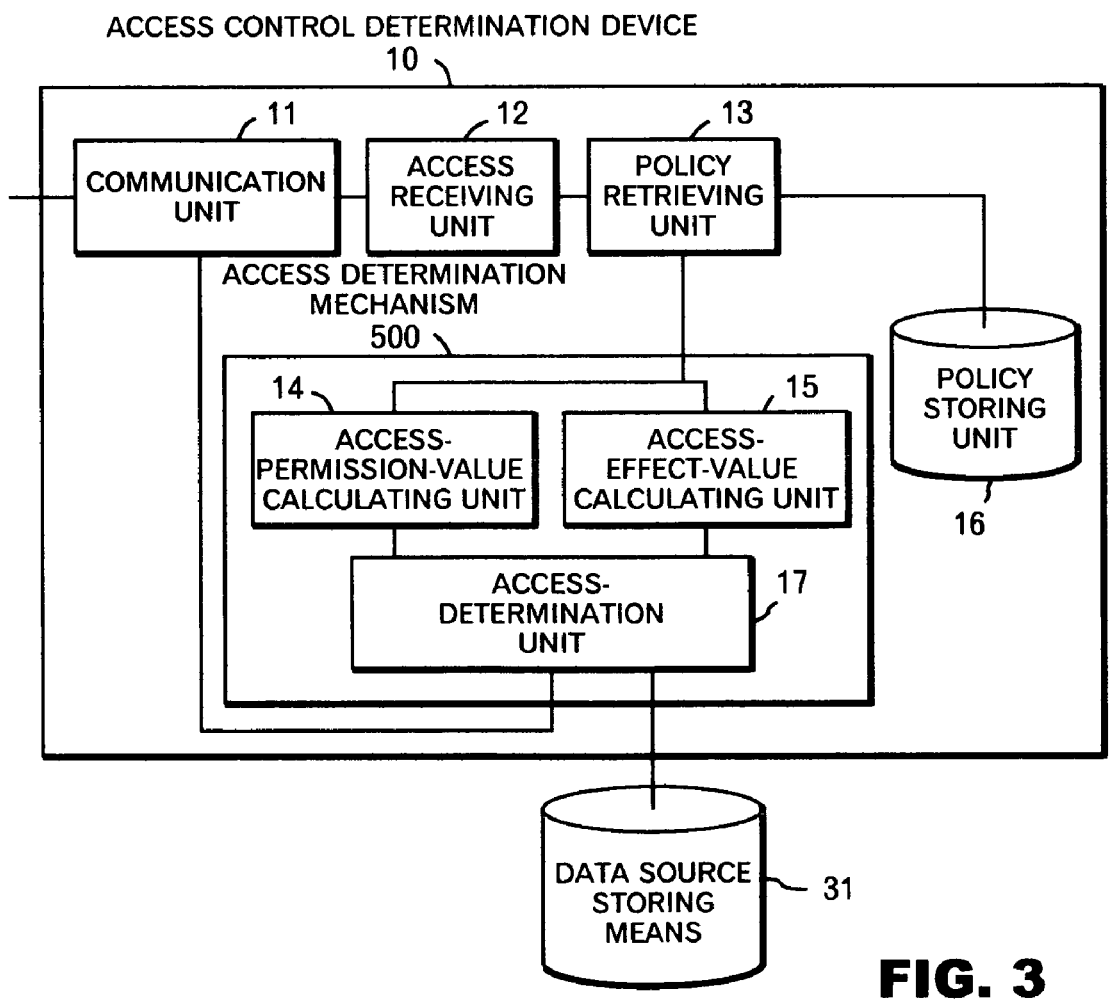
FIG. 3 is a diagram showing a hardware configuration of an access control determination device.

As shown in FIG. 3, the access control determination device 10 includes a communication unit 11, an access receiving unit 12, a policy retrieving unit 13, a policy storing unit 16, and an access determination mechanism 500. The access determination mechanism 500 includes an access-permission-value calculating unit 14, an access-effect-value calculating unit 15, and an access determination unit 17.

The access control determination device 10 may be a general computer. In other words, the function of the access control determination device 10 may be realized by an access control determination device 10 including a central processing unit (hereinafter referred to as "the CPU"), a storage memory, an I/O interface, a mass storage device, input and output devices (a display, a speaker, a keyboard, and a mouse).

The communication unit 11 is connected to the communication line network 30 and performs communications. The communication unit 11 may be a network interface, and may be a modem, a LAN card, a LAN board or the like.

The access receiving unit 12 is a unit receiving access to a part of an XML document from a user. The access to the data source is performed by the client function of the user terminal 20. The access receiving unit 12 receives this access. The access receiving unit 12 identifies a node on the basis of the information of the name of the user making the access, the section of the user, the position of the XML document the access to which is attempted, and creates a path expression from the node. The created path expression is transmitted to the policy retrieving unit 13.

The policy retrieving unit 13 retrieves the appropriate policy from the policy storing unit 16 on the basis of the path expression created by the access receiving unit 12. In other words, the policy retrieving unit 13 retrieves, from the policy storing unit 16, the policy corresponding to each of the nodes constituting the path expression.

The policy storing unit 16 is a unit in which policies are stored. The policy storing unit 16 may be means such as a general hard disk and a memory, or may be means for storing the policies on a storage medium such as a DVD and a CD. The policy retrieving unit 13 retrieves the appropriate policy(s) from among the policies stored in the policy storing unit 16.

The access determination mechanism 500 may be included inside the access control determination device 10 as shown in FIG. 3, or may be included outside the access control determination device 10 as a different hardware device (such as a computer).

The access-permission-value calculating unit 14 is means for calculating an access permission value. Here, the access permission value is a criterion value for giving permission for access. The access-permission-value calculating unit 14 calculates an access permission value on the basis of the path expression created by the access receiving unit 12. The access-permission-value calculating unit 14 transmits the result of this calculation to the access determination unit 17.

The access-effect-value calculating unit 15 is means for calculating an access effect value. Here, the access effect value is a value calculated on the basis of the path expression created by the access receiving unit 12 and the policy retrieved by the policy retrieving unit 13. The access-effect-value calculating unit 15 transmits the result of this calculation to the access determination unit 17.

The access determination unit 17 is means for determining whether or not access should be permitted from the access permission value calculated by the access-permission-value calculating unit 14 and the access effect value calculated by the access-effect-value calculating unit 15. After determining whether or not the access should be permitted, the access determination unit 17 may access the data source storing means 31 and provide information included in the part of the XML document, on which the determination has been made, to the user terminal 20 on the basis of the determination whether or not the access should be permitted.

Figure 4:
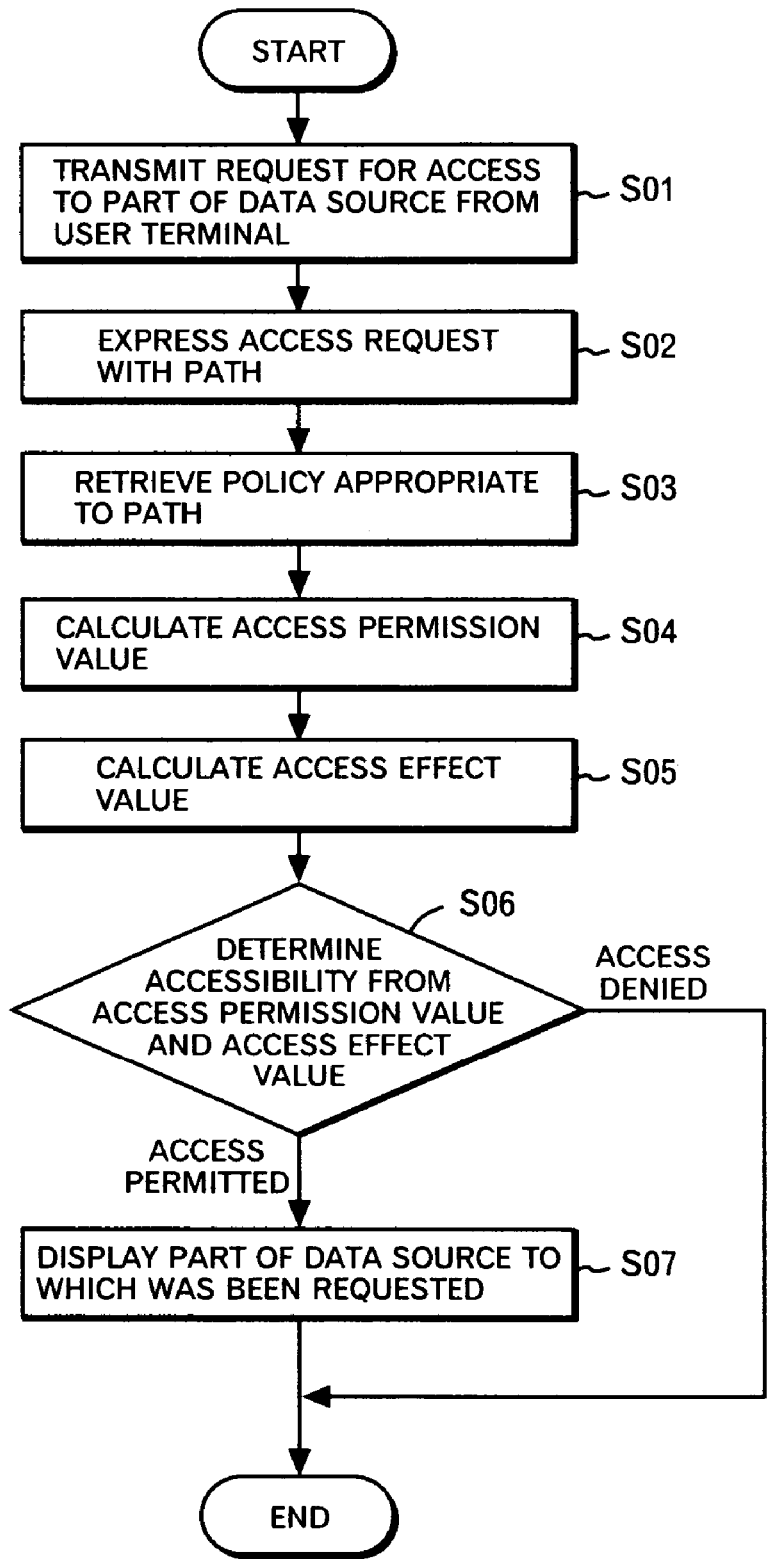
FIG. 4 is a flow chart showing operation executed by the access control determination device.

A description will be given of the specific operation performed by each means of the access control determination device 10 with reference to the flowchart of FIG. 4.

First of all, a request for access to a part of the data source (an XML document or the like) stored in the data source storing means 31 is transmitted from the user terminal 20 to the access control determination device 10 (S01). This request may be transmitted to the access control determination device 10 via the communication line network 30 as in the case of the user terminal 20. On the other hand, since the access control determination device 10 includes the input means such as a keyboard, the request from the user may be directly transmitted to the access control determination device 10 without using the communication line network 30.

The access receiving unit 12 of the access control determination device 10 receives the request from the user terminal 20, and expresses this request with a predetermined path (S02). This path is a character string in which information concerning this request is concentrated. Here, the information concerning this request includes where the user making the access belongs, the name of the same user, and the information on the location of the data source the access to which is attempted, for example.

On the basis of the path information, the policy retrieving unit 13 of the access control determination device 10 retrieves the policy appropriate to the path from the policy storing unit 16 (S03). The number of the retrieved policies appropriate to the path is not necessarily one. In other words, there is a case in which a plurality of policies retrieved exist for one path.

Next, the access-permission-value calculating unit 14 of the access determination mechanism 500 calculates the access permission value (S04). The access permission value is calculated only on the basis of the path expressed by the access receiving unit 12.

In the meantime, the access-effect-value calculating unit 15 calculates the access effect value on the basis of the policy retrieved by the policy retrieving unit 13 and the path expressed by the access receiving unit 12 (S05). If a plurality of policies are retrieved by the policy retrieving unit 13, the access effect value is calculated by using all the policies retrieved.

The access determination unit 17 determines whether or not the access should be permitted by using the access permission value and the access effect value calculated in the above steps (S06). Specifically, the determination is made by comparing the values (character strings) of the access permission value and the access effect value. If the access determination unit 17 determined that the access by the user should not be permitted, the access determination unit 17 may finish the process without performing further processes, or may transmit, to the user terminal 20, the information that the access has been denied.

If the access determination unit 17 determines that the access by the user may be permitted, the access determination unit 17 accesses the data source storing means 31, and performs the display of the part of the data source the access to which is requested on the display means 21 of the user terminal 20 (S07).

(XPath)

An explanation will be given of the XPath as an example of the "path" used in the present invention. The XPath is used for defining the object the access to which is controlled. In other words, the XPath defines the syntax for designating a certain part of an XML document. More specifically, by using the XPath, it is possible to designate a desired position in the XML document even if an index or the like is not embedded in the XML document.

Assume that, as an example of typical policies, a policy, "Alice can see personnel information, but cannot see confidential information; Bob cannot see either personnel information or confidential information," is inputted. To simplify this policy, the access control policy described in a path expression language shown in Table 1 below is used. For a part of the path expression language of Table 1, the XML Path Language (XPath) can be used.

TABLE 1

| Name | Explanation | Example |
|---|---|---|
| Subject-Type | group, user ID, function | UserID |
| Subject | identifier of accessing user | Alice |
| Object | path expression to designate a position of the accessed document | /site/people |
| Mode-Action | +: access possible/−: access impossible R: reading out, W: writing, U: updating, D: deletion If the alphabet is uppercase, all of the following nodes can be accessed. If the alphabet is lowercase, the relevant node only can be accessed. | −R, +r |

First of all, an explanation will be given of the path expression language by using Table 1. Subject-Type determines what kind Subject is. For example, it is possible to employ UserID as Subject-Type and to employ UserName as Subject. In addition, it is possible to employ Group as Subject-Type and to employ GroupName as Subject. Incidentally, Object is an object the access to which is controlled, designating the position or the part of the data source to which a user actually makes access. Each element in the path expression specified by Object is defined as a path value. Mode-Action is a content of the determination which is effective when the conditions of Subject and Object are satisfied. The content of the determination may be, for example, a content of "access permitted" or "access denied", or a content of "access possible" or "access denied" for reading out. In this example, described is the determination made when a user attempts to allow the data to be read out. However, the present invention can be similarly applied to the determination whether or not the access by a user for writing should be permitted, the determination whether or not the access by a user for updating should be permitted, and the determination whether or not the access by a user for deletion should be permitted.

The Mode-Action of +R means that all of the nodes not higher in the hierarchy than the part designated by Object can be read. On the other hand, +r means that only the node at the relevant hierarchical level can be read. When +R is taken for Mode-Action, an upper node can determine all of the Mode-Actions for the lower nodes.

Herein, an upper node in relation to a lower node is described as a parent node, or an ancestor node, while a lower node in relation to an upper node is described as a child node, or a descendant node.

Moreover, Mode-Action may not necessarily be an end result of determination. For example, in the case of a condition with which it is determined by the use of a data value from the data source whether or not access should be permitted, Mode-Action may be a predicate expression which should be satisfied by a data value.

A predicate expression is a determination expression used when a data value is read out from a data source and the access control is performed on the basis of the data value. When the condition of this predicate expression is satisfied, the determination content of Mode-Action set to this node is employed. In other words, a predicate expression means that, when a data value corresponding to a conditional variable x is read out from a data source, and the data value satisfies the content of the predicate expression (when the value is larger than 100, for example), the determination whether or not the access should be permitted is made.

An access control policy is composed of a rule or a plurality of rules. For example, one rule is expressed as follows.

(Expression 1)

$$\text{<Subject-Type, Subject, Object, Mode-Action>} \quad (1)$$

The above described policy for Alice and Bob will be described as shown in the expression (2) below when the access control policy is used. Here, assume that personnel information is positioned where the path, /site/people, designates in the XML document, and similarly, confidential information is positioned where /site/secret designates. In the expression (2), three rules are described in the access control policies.

<USERID, Alice, /site/people, +R>

<USERID, Alice, /site/secret, −R>

$$\text{<USERID, Bob, /site, −R>} \quad (2)$$

For example, if the path expression of Object of the node to be accessed by the user (Alice) is /site/people/alice, the whole path is expressed as (USERID, Alice, /site/people/alice). In response to this path expression, the policy retrieving unit 13 retrieves the appropriate policy. Among the rules in the expression (2), the policy retrieving unit 13 retrieves <USERID, Alice, /site/people, +R>.

(Expression 3)

$$\text{<USERID, Alice, }/a/c//d\text{, +R>} \quad (3)$$

As shown in the expression (3), Object can include "//". In this case, for example, no matter whatever hierarchy exists under /a/c/, Alice can access /d under the hierarchy. In other words, "//" means that no matter whatever path value the third hierarchical level is, it is possible to access /d under the level.

As an example of the case in which Object includes "//", when there are two access control policies, <UserID, Seki, /a, +r> and <UID, Seki, /a//c, −R>, and the path expression of the node to be accessed is /a/b/c/d, the policies to be applied (pairs each including a control path and a control effect) are <UserID, Seki, /a, +r> and <UID, Seki, /a//c, −R>.

Especially, when/is included in the control policy, the control path is the part of P (/a/b/c/d) matched by Object (/a//c) in the control policy, which part is (/a/b/c).

In this way, it is possible to describe the access control policy by the use of the XPath, and the policy is stored in the policy storing unit 16. The policy retrieving unit 13 searches the policies stored in the policy storing unit 16 for the appropriate policy(s) on the basis of the path, the access to which is attempted, brought into an expression by the access receiving unit 12.

(Technique of Policy Retrieval and Access Control Determination)

As existing techniques, with regard to the mechanism for retrieving a policy and making the access determination, researches as shown in Table 2 below are being conducted.

"XML Access Control Using Static Analysis", in ACM CCS, 2003, for example, which enables complicated access control policies to be set. The matching method is a method in which the access control is performed with the access control policies converted into tree structures. This method is described in Japanese Patent Application No. 2004-191425, for example.

There is a case in which, when the access control is performed by using these various methods, a plurality of policies are retrieved on the basis of the XPath expression expressed according to an access request, and the determination is made on the basis of the plurality of policies. In this case, there arises the necessity to perform calculation for each of the

TABLE 2

| Categories | Methods | Access Dependence |
|---|---|---|
| Tablemap Method | Paths and access conditions are stored in a table. At the time of execution, an access condition is retrieved by using the path expression of the node, and further evaluation gives the control effect for the node. | Guarantee is given to the access dependence at the time of creating the access conditions. |
| | The control effects are previously calculated for each XML document, and stored in a map. The control effect can be obtained fast without evaluating the control effect of the access to the node. | Guarantee is given to the access dependence at the time of creating the map. |
| Filtering Method | The access control policies are converted into filtering trees. At the time of execution, the matched policy is searched for fast by using the path expression of the node. If the policy is found, the control effect becomes "access permitted". | Only "access permitted" is managed. Moreover, it is premised that all the downstream nodes of the "access-permitted" node are "access-permitted". |
| Automaton Method | The access control polices are converted into automatons. By using the path expression of the node to be accessed, state transitions are performed on the automaton. The control effect is obtained from the unique end state attained when the process ends. | Since dependence check will not be performed, it is necessary for the access control policies to guarantee the dependence. |
| Matching Method | The access control policies are converted into matching trees. By using the path expression of the node to be accessed, the matched control effect is searched for. The control effect for the node is determined from the thus found control effect. | It is possible to fast and simultaneously find a plurality of control effects applicable to the nodes from the root node to the node to be accessed. When the control effects are evaluated, it is checked whether or not the dependence is satisfied. |

The technique of the tablemap method is described in the above Naishin Seki. In addition to this document, this technique is described in T. Yu, D. Srivastava, L. V. S. Lakshmanan, and H. V. Jagadish, "Compressed Accessibility Map: Efficient Access Control for XML", in VLDB, 2002, for example, in which the access determination is made by the use of Tables. The filtering method is a technique described in M. Altinel and M. Franklin, "Efficient filtering of XML documents for selective dissemination of information", in VLDB, 2000, for example, in which only the accessible parts are defined by policies. The automaton method is a technique described in M. Murata, A. Tozawa, M. Kudo and H. Satoshi, plurality of policies. In the present invention, proposed is a method of efficiently performing the calculation for the plurality of policies.

Accordingly, the present invention is applicable when the access determination is made by performing calculation for each of the plurality of policies as described above, even if an access control method other than those described in Table 2 is used.

[Prerequisite]

An explanation will be given of prerequisites to the method proposed in the present invention. The prerequisites are about the following two points: (1) the solution to the conflict arising from a plurality of policies; and (2) the default control effect.

An explanation of (1) will be given. If a plurality of policies are retrieved, there is a case where conflict arises among the plurality of policies. Specifically, this conflict arises when controls of "access permitted" and "access denied" are simultaneously applied to one node. An administrator allows the access determination unit 17 to store such a priority that, when the conflict arises, one of "access denied" and "access permitted" is prioritized. In this way, when the conflict arises, the access determination unit 17 can determine which effect is to be prioritized.

An explanation of (2) will be given. For the node the access to which is not controlled by the access control policy, it is necessary to previously determine which of "access permitted" and "access denied" is employed. This is the default control effect. In general, in the system ensuring the security, "access denied" is employed as the default control effect.

(Calculation Method and Determination Method)

After the policy retrieving unit 13 retrieves a plurality of policies, the access determination mechanism 500 calculates an access permission value and an access effect value. The access-permission-value calculating unit 14 of the access control determination device 10 calculates the access permission value. The access permission value is the minimum value allowable for the node the access to which is attempted to be reached. On the other hand, the access-effect-value calculating unit 15 of the access control determination device 10 calculates the access effect value. The access effect value is calculated on the basis of the retrieved access control policy(s).

On the basis of the access permission value and the access control value which are calculated, the access determination unit 17 performs the access determination. Specifically, when (access effect value)≧(access permission value) (when the access permission value and the access effect value are represented by numbers), the access is permitted.

(Calculation Sequence)

The access determination unit 17 receives a set of multiple policies (each including a control path and a control effect) obtained from the policy retrieving unit 13 as the input, resolves the conflict between these control effects, and determines the control effect. The resolution of the conflict may be performed by examining each pair (the control path and the control effect) in ascending order of the path lengths. As an example, the sequence of the conflict resolution is as follows. Let the path length be n. The examination is performed in order from the pair in which n=1.

TABLE 3

When the control effect is +r, it is examined whether 1, 2 and 3 hold also with respect to n + 1 or larger.
When the control effect is +R, it is examined whether 3 holds also with respect to n + 1 or larger.
It is necessary for the control effect not to be −R.

For example, assume that the set of (the control path and the control effect) as shown below has been obtained for the path /a/b/c/d.

(Expression 4)

(/a, +r)

(/a/b, +r)

(/a/b/c, +R)

Since the control effect is +r when n=1, 2 (paths /a and /a/b), the case of n=3 is examined. However, since the control effect is +R for n=3 (path /a/b/c), it suffices if the control effect is not −R for n=4 (path /a/b/c/d). Therefore, the access should be permitted. For the purpose of efficiently implementing the conflict resolution as described above, a method is effective in which the set of policies (the control paths and the control effects) is sorted in order of the length of the control paths, and the access effect value is then calculated.

A detailed explanation will be given below of the implementation of the access determination unit 17 using this access effect value.

(Access Effect Value)

A description will be given of a specific method whereby the access-effect-value calculation unit 15 calculates an access effect value on the basis of the path the access to which has been attempted, and access control policies. The Mode-Action appearing in the access control policy determines the control effect of the policy. For example, +r indicates the permission without access propagation to the descendants. +R indicates the permission with access propagation to the descendants. On the other hand, −R indicates the denial with access propagation to the descendants. These access control effects are represented by different data structures, and are allowed to be reflected with respect to the nodes included in the path for which nodes these control policies are required, so that the access control value is calculated.

Specific implementation will be explained. For example, it is conceivable that the respective control effects are represented by numbers or character strings as shown in Tables 4 and 5. In addition, in Table 4, a description for the path the access to which is not controlled is also written (N/A). In this case, the corresponding path and the descendants thereof are all undefined.

TABLE 4

| Mode Action | Number | Meaning | Control effect |
|---|---|---|---|
| +r | 2 | Permission without access propagation to the descendants | Access to the Object is permitted. Access to the descendants is undefined. |
| +R | 3 | Permission with access propagation to the descendants | Access to the Object and the descendants is permitted. |
| −R | 0 | Denial with access propagation to the descendants | Access to the Object and the descendants is denied. |
| N/A | 1 | | The path and the descendants thereof are all undefined. |

TABLE 5

| Mode Action | Character string | Meaning | Control effect |
|---|---|---|---|
| +r | c | Permission without access propagation to the descendants | Access to the Object is permitted. Access to the descendants is undefined. |
| +R | d | Permission with access propagation to the descendants | Access to the Object and the descendants is permitted. |

TABLE 5-continued

| Mode Action | Character string | Meaning | Control effect |
|---|---|---|---|
| −R | a | Denial with access propagation to the descendants | Access to the Object and the descendants is denied. |
| N/A | b | | The path and the descendants thereof are all undefined. |

First, an explanation will be given with regard to a method using the numbers in Table 4. Let the path expression P for a node $e_n$ to be accessed be represented by $/e_1/e_2/\ldots/e_i/\ldots/e_n$. With the use of the numbers corresponding to the respective Mode-Actions in Table 4, it is possible to replace each of the nodes, from the root node $e_1$ to the node $e_n$ to be accessed, with the number. Thus, it is possible to generate the access effect value. The algorithm for generating the access effect value Effect for the path $P=/e_1/e_2/\ldots/e_i/\ldots/e_n$ is as follows.

(An Example of the Algorithm Used in Calculation of the Access Effect Value)

Assume that there are m of elements in a set of pairs each including a control path and a control effect to be applied to the path P, an arbitrary control path is $Q_j$, and the length thereof is $|Q_j|$. In addition, the corresponding control effect is $E_j$. In the calculation method, first of all, the array, effect, the length of which is n is initialized, so that all the elements are set to 1. Moreover, the element of the array corresponding to the node $e_i$ is effect[i]. The access effect value Effect is calculated according to such a flow as shown in Table 6 below. Incidentally, assume that // is not present in the control path.

TABLE 6

```
Effect=0
For(j=0;j<m;j++)
If(E_j=='-R')then
Effect=0// "access denied" is given a higher priority to "access permitted"
return
Else
    If (E_j=='+r')then
        If(effect[|Q_j|-1]==3||effect[|Q_j|-1]==2)then continue
        Else effect[|Q_j|-1]=2    //when effect[|Q_j|-1]=1
    Else                            //when E_j='+R'
        If(effect[|Q_j|-1]==1||effect[|Q_j|-1]==2)then
            effect[|Q_j|-1]=3
        Else continue
    End if
End if
    End for
For(i=n-1;i>=0;i--)
Effect=Effect+effect[i]*10^(n-1-i)
End for
```

A simple example will be cited using the algorithm shown in Table 6. Here, only the Object parts of the access control policies are considered. Assume that the path P is /a/b/c/d/e, and there are three pairs each including the control path and the control effect which are to be applied, (1) (/a, +r), (2) (/a/b, +R), and (3) (/a/b/c/d/e, +r). Under the above conditions, the access effect value is calculated using the above algorithm.

As an initial value, the array, effect, becomes {1, 1, 1, 1, 1}. When (1) has been processed, the control effect of +r is applied to /a. Thus, effect[0] becomes 2, and the array becomes {2, 1, 1, 1, 1}. When (2) has been processed, effect [1] becomes 3, and the array becomes {2, 3, 1, 1, 1}. In addition, when (3) has been processed, effect[4] becomes 2, and the array becomes {2, 3, 1, 1, 2}. Accordingly, the access effect value becomes 23112.

It is also possible to calculate the effect value with the use of a similar algorithm by using the character strings in Table 5. However, it is necessary to use a different algorithm when Effect is calculated at the last.

TABLE 7

```
For(i=n-1;i>=0;i--)
Effect=Effect.append(effect[i])
End for
```

Here, append is the method adding a new character string on the right of the character string, Effect. A simple example will be cited. Assume that P is /a/b/c/d/e, and there are three pairs each including the control path and the control effect to be applied, (1) (/a/b/c/d/e, +r), (2) (/a, +r), and (3) (/a/b, +R). Under the above conditions the access effect value is calculated using the above algorithm. As an initial value, the array, effect, becomes {'b', 'b', 'b', 'b', 'b' }. When (1) has been processed, effect[4] becomes 'c', and the array becomes {'b', 'b', 'b', 'b', 'c' } since the control effect of +r is applied to /a/b/c/d/e. When (2) has been processed, effect[0] becomes 'c', and the array becomes {'c', 'b', 'b', 'b', 'c'}. In addition, when (3) has been processed, effect[1] becomes 'd' and the array becomes {'c', 'd', 'b', 'b', 'c'}. Accordingly, the access effect value becomes "cdbbc".

On the other hand, if '//' is included in the control path, it is necessary to previously expand the control path appropriate to P, and to add the control path. For example, when the control path is /a//b, the control effect is +r, and when P is /a/b/d/b/e/b, the expanded control paths are /a/b, /a/b/d/b, and /a/b/d/ble/b, so that the number of pairs each including the control path and the control effect becomes three. The control paths are (/a/b, +r), (a/b/d/b, +r), and (/a/b/d/b/e/b, +r), respectively.

(Access Permission Value)

A description will be given of a specific method whereby the access-permission-value calculating unit 14 calculates the access permission value on the basis of the path the access to which has been attempted. The access permission value is the minimum access effect value which is necessary for the access to be permitted. As described above, whether or not the access should be permitted has a dependence on the control effect for the ancestor in terms of the hierarchical structure. Accordingly, the necessary condition for the access to the path to be permitted is that the access to all of the ancestor nodes thereof is also permitted. Let the path expression P for a node $e_n$ to be accessed be represented by $/e_1/e_2/\ldots/e_i/\ldots/e_n$. Permission for access to P means that the access to all the nodes from $e_1$ to $e_n$, is permitted. In order to satisfy this, it is necessary to satisfy the following two conditions.

(1) No node is defined as −R from the node $e_1$ to the node $e_n$. (2) All the nodes from $e_1$ to $e_n$, are defined as +r, or all the nodes the control effects of which are not defined have the ancestor defined as +R.

In order to satisfy the condition (1), it is sufficient that zero is not present in the number expressions of the nodes from $e_1$ to $e_n$. In addition, a sufficient condition for satisfying the condition (2) is expressed as (2)+ or (2)*3(1|2|3)* in the regular expression. On the other hand, when the character strings are used, the condition is expressed as (c)+ or *d(b|c|d)*. An example in the case of the number expression is as follows: when P is /a/b/c/d/e, the access effect value for satisfying the condition (2) is 22222, 23111, 23211, 23221, 23222, 23311, 23321, 23322, 23331, 23332, 23333, 31111 or 32111 . . . (the remaining values which begin with 3 are omitted). Accordingly, the minimum value of the access effect value is found to be 22222. Thus, the access effect value generated from 'all the nodes from $e_1$ to $e_n$, are defined as +r,' is the access permission value.

As an example, the algorithm for generating the access permission value minEffect of $P=/e_1/e_2/ \ldots /e_i/ \ldots /e_n$ is as follows. Table 8 shows the generation algorithm in the case of using the number expression, and Table 9 shows the generation algorithm in the case of using the character strings.

TABLE 8 minEffect=0
For(i=n−1;i>=0;i−−)
minEffect=minEffect+2*10$^{(n-1-i)}$
End for

TABLE 9 minEffect=' '
For(i=n−1;i>=0;i−−)
minEffect=minEffect.append( 'c' )
End for (Regarding Access Determination)

The access determination unit 17 determines the control result by the use of the access permission value minEffect and the access effect value Effect inputted. Specifically, this is as shown in Table 10 below.

TABLE 10

If Effect≧minEffect then
    Accessible    // access permitted
Else
    Inaccessible    // access denied
End if When the access determination is made by the use of the numbers, with regard to comparison, the magnitudes of the numbers are compared. When the character strings are used, the comparison of a defined order of the character strings is made. The defined order may be the alphabetical order, which is the lexicographic comparison (a->b->c->d), or may be defined such that the priority of the character strings is first defined in an order other than the alphabetical order (a is given a higher priority to c, for example), and the defined order is then employed as the priority of the character strings.

FIG. 5 shows a part of a specific XML document of a medical record. This XML document includes patient information (such as names, sex, addresses, profession, and medical insurance company names), clinical histories (such as dates, symptoms, diagnoses, doctor information, and therapies). Assume that the access control policies for nurses are defined as follows.

(Expression 5)

(1) (ROLEID, nurse, /patients, +r)

(2) (ROLEID, nurse, /patients/patient, +r)

(3) (ROLEID, nurse, /patients/patient/submitted, +r)

(4) (ROLEID, nurse, /patients//name, +R)

(5) (ROLEID, nurse, /patients/patient/therapy, +R)

These access control policies define the nurses as those capable of reading name and therapy of patients, and the descendants thereof. In addition, the policies define the nurses as those capable of knowing, from presence or absence of a submitted element, whether or not there is the clinical history of a patient, but incapable of reading the specific content.

For example, when a nurse accesses /patients/patient/name/firstname, the output from the policy retrieving unit 13 is a set of pairs each including the control path and the control effect which are to be applied, and more specifically as follows.

(Expression 6)

(/patients, +r) (from policy (1))

(/patients/patient, +r) (from policy (2))

(/patients/patient/name, +R) (from policy (4))

Since /patients/patient/name satisfies /patients//name, the control path of /patients/patient/name can be obtained on the basis of the policy (4).

(Determination Using Numbers)

The access permission value minEffect is calculated by the access-permission-value calculating unit 14. According to the algorithm, minEffect=2222. In the meantime, the access effect value is calculated by the access-effect-value calculating unit 15. First of all, the array effect[4] is generated, the initial state of which is set to {1,1,1,1}. Then, the set of pairs each including the control path and the control effect is processed sequentially. On the basis of (/patients, +r), effect[0]=2. On the basis of (/patients/patient, +r), effect[1]=2. In addition, on the basis of (/patients/patient/name, +R), effect[2]=3. Thus, the access effect value (Effect) of /patients/patient/name/firstname is 2231. Accordingly, since Effect>minEffect (access permission value), the access to /patients/patient/name/firstname will be permitted.

In the meantime, when a nurse accesses /patients/patient/submitted/doctor/name/firstname, the output from the policy retrieving unit 13 is as follows.

(Expression 7)

(1) (/patients, +r) (from policy (1))

(2) (/patients/patient, +r) (from policy (2))

(3) (/patients/patient/submitted, +r) (from policy (3))

(4) (/patients/patient/submitted/doctor/name, +R)
    (from policy (4))

Since /patients/patient/submitted/doctor/name satisfies /patients//name, the control path of /patients/patient/submitted/doctor/name can be obtained on the basis of the policy (4).

The access permission value minEffect is calculated by the access-permission-value calculating unit 14. According to the algorithm, minEffect-222222. In the meantime, the access effect value Effect is calculated by the access-effect-value calculating unit 15. First of all, the array effect[6] is generated, the initial state of which is {1, 1, 1, 1, 1, 1}. Then, the set of pairs each including the control path and the control effect is processed sequentially. On the basis of (/patients, +r), effect[0]=2. On the basis of (/patients/patient, +r), effect[1]=2. In addition, on the basis of (/patients/patient/submitted, +r), effect[2]=2. On the basis of (/patients/patient/submitted/doctor/name, +R), effect[4]=3. Thus, with regard to the access effect value of /patients/patient/submitted/doctor/name/firstname, Effect=222131.

Accordingly, since the comparison between the access permission value and the access effect value results in Effect<minEffect, the access to /patients/patient/submitted/doctor/name/firstname will be denied. As is understood from the value of Effect, since the permission for access to /patients/patient/submitted/doctor is not given, the dependence of the control effect on all of the ancestor nodes is not satisfied, and a value of Effect smaller than the value of minEffect is therefore derived. Thus, the access to /patients/patient/submitted/doctor/name/firstname will be denied.

Next, the method presented in the present invention can also deal with the case where a limitation is added to the node by the use of a predicate expression, and the access control based on a data value is performed. For a part of the XML document shown in FIG. 5, and for a patient, the access control policies are defined.

(Expression 8)

(1) (ROLEID, patient, /patients, +r)

(2) (ROLEID, patient, /patients/patient[@id=$uid], +r)

(3) (ROLEID, patient, /patients/patient[@id=$uid]/therapy, +R)

Assume that $uid is a system function, which is unique identification ID that each patient has. When a user whose patient identification ID is 100 ($uid=100) attempts to access /patients/patient/therapy/amount in the XML document shown in FIG. 5, the predicate expression @id=$uid concerning patient included in the policies (2) and (3) is satisfied. Therefore, the set of pairs each including the control path and the control effect includes three items. Specifically, the pairs are as follows.

(Expression 9)

(1) (/patients, +r) (from policy (1))

(2) (/patients/patient, +r) (from policy (2))

(3) (/patients/patient/therapy, +R) (from policy (3))

The access permission value minEffect is calculated by the access-permission-value calculating unit 14. According to the algorithm, minEffect=2222 is calculated. In the meantime, the access effect value is calculated by the access-effect-value calculating unit 15. First of all, the array effect[4] is generated, the initial state of which is set to {1, 1, 1, 1}. Then, the set of pairs each including the control path and the control effect is processed sequentially. On the basis of (/patients, +r), effect[0]=2. On the basis of (/patients/patient, +r), effect[1]=2. In addition, on the basis of (/patients/patient/therapy, +R), effect[2]=3. Thus, with regard to the access effect value of /patients/patient/therapy/amount, Effect=2231. Thus, the patient will be permitted to access /patients/patient/therapy/amount.

When a patient with the uid of 101 attempts to access /patients/patient/therapy/amount in the same XML document, the set of pairs each including the control path and the control effect becomes (/patients, +r) only, because the predicate expression @id=$uid is not satisfied. Accordingly, the access will be denied because the access effect value Effect becomes 2111, which is smaller than the value of minEffect.

(Determination Using Character Strings)

Assume that the access control policies for the users who are nurses are defined as follows.

(Expression 10)

(1) (ROLEID, nurse, /patients, +r)

(2) (ROLEID, nurse, /patients/patient, +r)

(3) (ROLEID, nurse, /patients/patient/submitted, +r)

(4) (ROLEID, nurse, /patients//name, +R)

(5) (ROLEID, nurse, /patients/patient/therapy, +R)

These access control policies define the nurses as those capable of reading name and therapy of patients, and the descendants thereof. In addition, the policies define the nurses as those capable of knowing, from presence or absence of a submitted element, whether or not there is the clinical history of a patient, but incapable of reading the specific content.

When a user who is a nurse accesses /patients/patient/name/firstname, the output from the policy retrieving unit 13 is a set of pairs each including the control path and the control effect which are to be applied, and more specifically as follows.

(Expression 11)

(1) (/patients, +r) (from policy (1))

(2) (/patients/patient, +r) (from policy (2))

(3) (/patients/patient/name, +R) (from policy (4))

Since /patients/patient/name satisfies /patients//name, the control path of /patients/patient/name can be obtained on the basis of the policy (4).

The access permission value minEffect is calculated by the access-permission-value calculating unit 14. According to the algorithm, minEffect="cccc". In the meantime, the access effect value Effect is calculated by the access-effect-value calculating unit 15. First of all, the array effect[4] is generated, the initial state of which is set to {'b', 'b', 'b', 'b' }. Then, the set of pairs each including the control path and the control effect is processed sequentially. On the basis of (/patients, +r), effect[0]='c'. On the basis of (/patients/patient, +r), effect[1]='c'. In addition, on the basis of (/patients/patient/name, +R), effect[2]='d'. Thus, the access effect value of /patients/patient/name/firstname is "ccdb". Accordingly, since "ccdb">"cccc", that is, (the access effect value Effect)>(the access permission value minEffect), the access to /patients/patient/name/firstname will be permitted.

In the meantime, when a nurse accesses /patients/patient/submitted/doctor/name/firstname, the output from the policy retrieving unit 13 is as follows.

(Expression 12)

(1) (/patients, +r) (from policy (1))

(2) (/patients/patient, +r) (from policy (2))

(3) (/patients/patient/submitted, +r) (from policy (3))

(4) (/patients/patient/submitted/doctor/name, +R) (from policy (4))

Since /patients/patient/submitted/doctor/name satisfies /patients//name, the control path of /patients/patient/submitted/doctor/name can be obtained on the basis of the policy (4).

The access permission value minEffect is calculated by the access-permission-value calculating unit 14. According to the algorithm, minEffect="ccccc". In the meantime, the access effect value Effect is calculated by the access-effectvalue calculating unit 15. First of all, the array effect[6] is generated, the initial state of which is {'b', 'b', 'b', 'b', 'b', 'b'}. Then, the set of pairs each including the control path and the control effect is processed sequentially. On the basis of (/patients, +r), effect[0]='c'. On the basis of (/patients/patient, +r), effect[1]='c'. In addition, on the basis of (/patients/patient/submitted, +r), effect[2]='c'. On the basis of (/patients/patient/submitted/doctor/name, +R), effect[4]='d'. Thus, with regard to the access effect value of /patients/patient/submitted/doctor/name/firstname, Effect="cccbdb".

Accordingly, since "cccbdb"<"cccccc", that is, (access effect value Effect)<(access permission value minEffect), the access to /patients/patient/submitted/doctor/name/firstname will be denied. As is understood from the value of Effect, since the permission for access to /patients/patient/submitted/doctor is not given, the dependence of the control effect on all of the ancestor nodes is not satisfied, and a value of Effect smaller than the value of minEffect is derived. Thus, the access to /patients/patient/submitted/doctor/name/firstname will be denied.

The method of determining access control realizing such an embodiment can be realized by a program to be executed on a computer or a server. As a storage medium for this program, an optical storage medium such as a DVD, an MO or a PD, a tape medium, a semiconductor memory, or the like can be cited. In addition, the program may be provided via a network with the use of, as a storage medium, a storage device, such as a hard disk or a RAM, which is provided in a server system connected to a private communication network or the Internet.

Hereinbefore, although a description has been given of an embodiment of the present invention, this is merely an exemplification, and does not particularly limit the present invention. The effects described in the embodiment of the present invention are cited only as the most preferable effects originated from the present invention. Effects of the present invention are not limited to the effects described in the embodiment of the present invention.

With the present invention, it suffices to calculate an access permission value and an access effect value when it is determined whether or not the access should be permitted. Specifically, the computational complexity required to determine the access control effect is kept to a number which is (the number of times of calculation required to obtain the access effect value)+(the number of times of calculation required to obtain the access permission value), that is, to |Q+1| which is obtained by adding the number of calculation (one) required to obtain the access permission value to the number of access control effects (the number of policies). Thus, it is possible to determine whether or not the access should be permitted through a small amount of calculation less than the conventional computational complexity n|Q|.

Although the preferred embodiment of the present invention has been described in detail, it should be understood that various changes, substitutions and alternations can be made therein without departing from spirit and scope of the inventions as defined by the appended claims.

The present invention is applicable not only to a database management system in which many users access a data source having a large amount of data, but also to a database management system in which a plurality of data sources having a large amount of data are stored in physically different servers and the like, and many users access these data sources.

What is claimed is:

1. A system for determining access control to a structured document, comprising:

an access receiving unit coupled to a storage device and configured to express access by a user to a structured document with a predetermined path from the storage device as a path expression upon the user attempting to access the structured document;

a policy storing unit coupled to the access receiving unit and configured to store a plurality of policies on a storage device, wherein the plurality of policies comprise a control path expressed with a path language, and a control effect representing whether or not access by the user should be permitted, wherein the plurality of policies is composed of at least one rule;

a policy retrieving unit coupled to the storage device and configured to retrieve an appropriate policy out of the plurality of policies on the basis of the predetermined path; and a central processing unit coupled to the policy retrieving unit and configured to:

calculate an access permission value on the basis of the predetermined path, wherein the access permission value is a minimum value allowable to permit access to the structured document;

calculate an access effect value on the basis of the path expression and the policy retrieved by the policy retrieving unit; and determine whether the access by the user to the structured document should be permitted on the basis of the access permission value and the access effect value, wherein if the access determination unit determines access by the user to the structured document is permitted, providing access to the user to the structured document;

wherein:

if the plurality of policies are retrieved by the policy retrieving unit, the access-effect-value calculating unit calculates the access effect value by using the plurality of policies retrieved, the central processing unit resolves a control effect conflict by examining the control path, the control effect, and a plurality of access conflict priorities, the access permission value and the access effect value are represented by a character string, and the access determination unit determines whether or not the access should be permitted by comparing the character string values of the access permission value and the access effect value, and the path language comprises Extended Markup Language (XML) Path Language, wherein:

the XML Path Language is used for designating a desired part of the structured document, the structured document comprises an embedded index or a non-embedded index, and the XML Path Language determines:

a subject type which is receiving access, a subject which is receiving access, the desired part of the structured document which a subject is receiving access, a subject's access permission to the desired part of the structured document when a condition of the subject receiving access and a condition of the desired part of the structured document are satisfied by a data value, wherein the subject's access permission to the desired part of the structured document comprises a determination expression if a data value corresponding to a conditional variable is read out from a structured document and the data value satisfies a content of the determination expression.

2. A method for determining access control to a structured document, comprising:

expressing access by a user to a structured document with a predetermined path from a storage device as a path expression upon the user attempting to access the structured document;

storing a plurality of policies on a storage device, wherein the plurality of policies comprising a control path expressed with a path language, and a control effect representing whether or not access by the user should be permitted, wherein the plurality of policies is composed of at least one rule;

retrieving from the storage device an appropriate policy out of the plurality of policies on the basis of the predetermined path;

calculating an access permission value on the basis of the predetermined path using a central processing unit, wherein the access permission value is a minimum value allowable to permit access to the structured document;

calculating an access effect value on the basis of the path expression and the policy retrieved using the central processing unit; and determining whether the access by the user to the structured document should be permitted on the basis of the access permission value and the access effect value using the central processing unit, wherein if the access determination unit determines access by the user to the structured document is permitted providing access to the user to the structured document, wherein if the plurality of policies are retrieved by the policy retrieving unit, the access-effect-value calculating unit calculates the access effect value by using the plurality of policies retrieved, wherein the access determination unit resolves a control effect conflict by examining the control path, the control effect, and a plurality of access conflict priorities, wherein the access permission value and the access effect value are represented by a character string, and the access determination unit determines whether or not the access should be permitted by comparing the character string values of the access permission value and the access effect value, and wherein the path language comprises Extended Markup Language (XML) Path Language, wherein:
the XML Path Language is used for designating a desired part of the structured document,
the structured document comprises an embedded index or a non-embedded Index, and
the XML Path Language determines:
a subject type which is receiving access,
a subject which is receiving access,
the desired part of the structured document which a subject is receiving access,
a subject's access permission to the desired part of the structured document when a condition of the subject receiving access and a condition of the desired part of the structured document are satisfied by a data value, wherein the subject's access permission to the desired part of the structured document comprises a determination expression if a data value corresponding to a conditional variable is read out from a structured document and the data value satisfies a content of the determination expression.

3. A computer program product for determining access control, the computer program product comprising a computer useable storage medium to store a computer readable program, wherein the computer readable program when executed on a computer causes the computer to perform operations, comprising:

expressing access by a user to a structured document with a predetermined path from a storage device as a path expression upon the user attempting to access the structured document;

storing a plurality of policies on a storage device, wherein the plurality of policies comprising a control path expressed with a path language, and a control effect representing whether or not access by the user should be permitted, wherein the plurality of policies is composed of at least one rule;

retrieving from the storage device an appropriate policy out of the plurality of policies on the basis of the predetermined path;

calculating an access permission value on the basis of the predetermined path using a central processing unit, wherein the access permission value is a minimum value allowable to permit access to the structured document;

calculating unit calculating an access effect value on the basis of the path expression and the policy retrieved using the central processing unit; and determining whether the access by the user to the structured document should be permitted on the basis of the access permission value and the access effect value using the central processing unit, wherein if the access determination unit determines access by the user to the structured document is permitted providing access to the user to the structured document, wherein if the plurality of policies are retrieved by the policy retrieving unit, the access-effect-value calculating unit calculates the access effect value by using the plurality of policies retrieved, wherein the access determination unit resolves a control effect conflict by examining the control path, the control effect, and a plurality of access conflict priorities, wherein the access permission value and the access effect value are represented by a character string, and the access determination unit determines whether or not the access should be permitted by comparing the character string values of the access permission value and the access effect value, and wherein the path language comprises Extended Markup Language (XML) Path Language, wherein:
the XML Path Language is used for designating a desired part of the structured document,
the structured document comprises an embedded index or a non-embedded Index, and
the XML Path Language determines:
a subject type which is receiving access,
a subject which is receiving access,
the desired part of the structured document which a subject is receiving access,
a subject's access permission to the desired part of the structured document when a condition of the subject receiving access and a condition of the desired part of the structured document are satisfied by a data value, wherein the subject's access permission to the desired part of the structured document comprises a determination expression if a data value corresponding to a conditional variable is read out from a structured document and the data value satisfies a content of the determination expression.

4. The system of claim 1, wherein the subject type which is receiving access is selected from the group consisting of: a group, a user, and a function.

5. The system of claim 1, wherein the subject which is receiving access is selected from the group consisting of: a group identification, a user identification, and a function identification.

6. The system of claim 1, wherein the desired part of the structured document which a subject is receiving access to is specified by a plurality of elements in the path expression, wherein the plurality of elements are defined as a path value.

7. The system of claim 1, wherein the subject's access permission to the desired part of the structured document is selected from the group consisting of: access permitted, access denied, and access possible.

8. The system of claim 1, wherein the subject's access permission to the desired part of the structured document permits access to a plurality of parts of the structured document lower in a hierarchical level than the designated part of the structured document.

9. The system of claim 1, wherein the subject's access permission to the desired part of the structured document permits access only to the desired part of the structured document.

10. The system of claim 1, wherein the policy retrieving unit retrieving an appropriate policy out of the plurality of policies on the basis of the predetermined path uses a retrieving method selected from the group consisting of: a tablemap method, a filtering method, an automation method, and a matching method.

11. The method of claim 2, wherein the subject type which is receiving access is selected from the group consisting of: a group, a user, and a function.

12. The method of claim 2, wherein the subject which is receiving access is selected from the group consisting of: a group identification, a user identification, and a function identification.

13. The method of claim 2, wherein the desired part of the structured document which a subject is receiving access to is specified by a plurality of elements in the path expression, wherein the plurality of elements are defined as a path value.

14. The method of claim 2, wherein the subject's access permission to the desired part of the structured document is selected from the group consisting of: access permitted, access denied, and access possible.

15. The method of claim 2, wherein the subject's access permission to the desired part of the structured document permits access to a plurality of parts of the structured document lower in a hierarchical level than the designated part of the structured document.

16. The method of claim 2, wherein the subject's access permission to the desired part of the structured document permits access only to the desired part of the structured document.

17. The method of claim 2, wherein the policy retrieving unit retrieving an appropriate policy out of the plurality of policies on the basis of the predetermined path uses a retrieving method selected from the group consisting of: a tablemap method, a filtering method, an automation method, and a matching method.

18. The computer program product of claim 3, wherein the subject type which is receiving access is selected from the group consisting of: a group, the user, and a function.

19. The computer program product of claim 3, wherein the subject which is receiving access is selected from the group consisting of: a group identification, a user identification, and a function identification.

20. The computer program product of claim 3, wherein the desired part of the structured document which a subject is receiving access to is specified by a plurality of elements in the path expression, wherein the plurality of elements are defined as a path value.

\* \* \* \* \*

UNITED STATES PATENT AND TRADEMARK OFFICE
CERTIFICATE OF CORRECTION

PATENT NO. : 7,630,984 B2 Page 1 of 1
APPLICATION NO. : 11/286948
DATED : December 8, 2009
INVENTOR(S) : Naizhen Qi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Second Day of November, 2010

David J. Kappos
*Director of the United States Patent and Trademark Office*